United States Patent Office 2,825,460
Patented Mar. 4, 1958

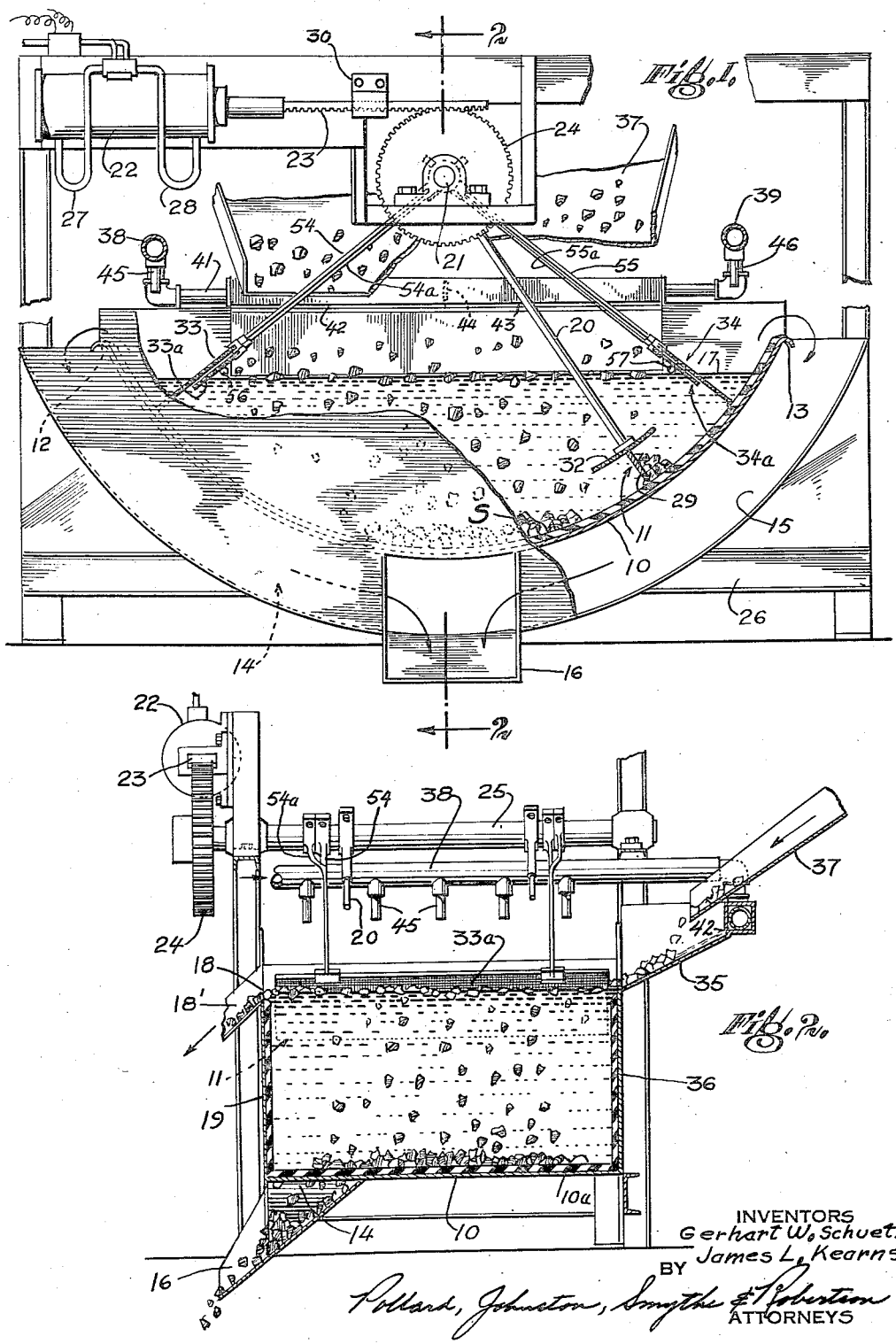

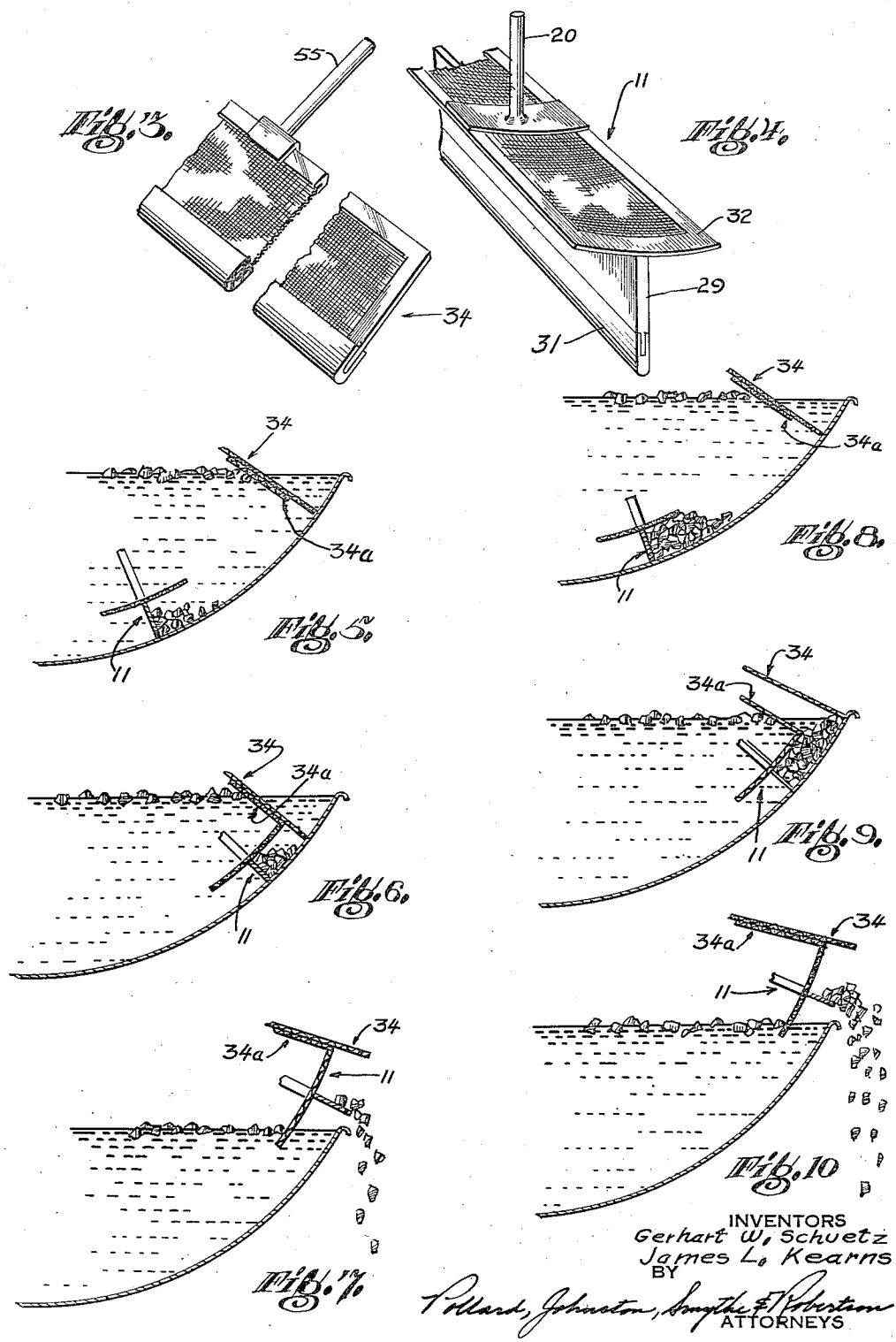

2,825,460
SEPARATORY APPARATUS

Gerhart W. Schuetz, New York, N. Y., and James L. Kearns, White Haven, Pa., assignors to The Ore & Chemical Corporation, New York, N. Y., a corporation of New York Application December 9, 1954, Serial No. 474,157

10 Claims. (Cl. 209—172.5)

This invention relates to an improved apparatus for the gravity separation of materials, as in coal cleaning, ore beneficiation, classification of solids, and for other uses, and more particularly to improvements in the type of separatory vessel described in the copending application of Rudolf Schreiber and Gerhart W. Schuetz entitled "Sink-Float Separatory Apparatus," filed August 17, 1953, Serial No. 374,686, now Patent No. 2,752,040, dated June 26, 1956.

An object of our invention is to provide apparatus for gravity separation of materials in liquid media in which material suspended in the medium, or floating at the surface of the medium—i. e. material suspended at or near the surface—will be kept away from the points of discharge of sunken material.

Such apparatus may take the form of a separator in which a vessel containing heavy liquid medium is employed. The medium may consist of water and finely ground materials, such as for example, finely ground magnetite, ferrosilicon or galena mixed to a specific gravity which floats one component of the material to be separated, and permits another component to sink. The process performed with the use of heavy media apparatus is generally referred to as dense media or heavy media separation.

Alternatively, the apparatus may take the form of a classifier in which coarse particles are separated from fine in a water suspension through the different in settling rate of different size particles in suspension.

In accordance with our invention, there is provided a separatory vessel to contain a pool of liquid medium, an outlet for floating material and a rake movable along the bottom of the vessel to move sunken material to an outlet adjacent the end of the path of the rake from which the sunken material can be discharged. One or more movable barrier screens operate adjacent the end of the path of the rake, the screens being movable at the approach of the rake to permit the rake to carry sunken material into the outlet while preventing the material suspended at or near the surface from entering such outlet.

The movable barrier screen or screens operating adjacent the end of the path of the rake can be employed in conjunction with means for the lateral introduction of liquid medium into the vessel, the liquid being injected into the vessel in such a manner as to produce currents at or near the surface of the pool of medium in the vessel, flowing away from the discharge outlet for the sunken material. Such liquid injection means are disclosed in a copending application of Gerhart W. Schuetz, Serial No. 474,156, filed December 9, 1954.

Other objects, features and advantages will be apparent from the following detailed description and the accompanying drawings in which we have set forth the best mode contemplated by us of carrying out our invention.

In the drawings:

Fig. 1 is a front elevational view of a preferred embodiment illustrated partly in section so as to reveal some of the details of construction and operation;

Fig. 2 is a vertical sectional view taken substantially along line 2—2 of Fig. 1;

Fig. 3 is a partial perspective view of a screen that is used to prevent the material suspended at or near the surface of the liquid medium from flowing into the discharge outlet for the sunken material;

Fig. 4 is a partial perspective view of the rake, showing the rake screen;

Figs. 5 through 7 are a series of diagrammatic views showing the discharge of a small quantity of sunken material from the vessel; and Figs. 8 through 10 are a series of diagrammatic views showing the discharge of a larger quantity of sunken material, the two sections of barrier screen cooperating to prevent the passage of floating material.

Referring first to Fig. 1 of the drawings, a preferred embodiment of the improved separatory apparatus is shown, which comprises a separatory vessel 10 of generally arcuate form in vertical section, and a rake 11 movable back and forth in a generally arcuate path along the inner surface of the vessel. The inner surface of the vessel may be lined with rubber or the like, as shown at 10a, but the lining may be omitted if desired. Discharge outlets 12 and 13 are located at the ends of the vessel, and the rake 11 serves the purpose of moving sunken material S (commonly referred to as the "sink") from the bottom of the vessel to the discharge outlets at the respective ends of the path of the rake. The sunken material that has been moved by the rake to the outlets falls down along the sink launders 14 and 15, and emerges from the sink discharge chute 16 in the front of the vessel.

Inside the vessel 10 is a pool 17 of liquid medium to be used for the separation of material. It can be a dense or heavy medium in the event that the apparatus is to be used for heavy media separation, or it can be water if the apparatus is to be used as a classifier. The liquid medium is maintained at a level near or slightly below the level of the sink discharge lips of the outlets 12 and 13. As shown in Fig. 2, a float outlet, or weir, 18 is located in the front wall 19 approximately centrally of the vessel, the overflow edge of this weir being slightly below the level of the medium in the vessel so that a continuous flow will take place through this weir to carry off material suspended at or near the surface of the liquid medium. In this manner, the material supplied to the vessel is separated or classified, for as previously described, the material that sinks to the bottom of the vessel is carried by the rake to one or the other of the sink discharge outlets, and thence to the launders 14 and 15, and chute 16.

So that the suspended material flowing from float weir 18 will not fall into the sunken material that leaves the vessel from discharge chute 16, an outlet trough 18' can be employed. This trough preferably is placed in the manner shown in Fig. 2 whereby the floating material moves in a straight path from the feed box 35 across the surface of the medium and through the outlet trough to the delivery point. If desired, a series of small perforations can be provided in the bottom of outlet trough 18', placed in vertical alignment with the open discharge chute 16. From the perforations, some of the liquid medium flowing through the trough will fall upon the chute 16 so as to assist in washing the sink down the chute.

The rake is mounted on arms 20 which extend radially with respect to the path of the rake to a pivotal mounting 21 above the vessel. The blade 29 of the rake is preferably rigidly mounted with respect to the arms 20, although if desired it could be pivotally connected in accordance with the aforesaid application Serial No. 374,686, now Patent No. 2,752,040 so that the rake blade will always have a favorable angle of inclination for discharge of the sink. According to the arrangement, the rake may be brought slightly above the sink discharge lips during each upward movement in order to completely discharge the material into the sink launders.

The rake is actuated by a double-acting air or hydraulic cylinder 22. Extending from the hydraulic cylinder is a continuation of the piston rod in the form of a rack 23 arranged to mesh with gear 24 affixed to a rockable shaft 25. The rake arms 20 are rigidly connected to this shaft so that as the gear and shaft oscillate, the rake will be moved back and forth across the bottom of the vessel. A bearing block 30 secured to frame 26 keeps the rack 23 in mesh with gear 24 and prevents lateral displacement of the rack. As shown in Fig. 1, the cylinder 22 is horizontally disposed, thereby enabling this apparatus to be utilized in a location in which head-room is restricted.

The cylinder may be supported directly by base frame 26 that supports the vessel 10, or alternatively it may be supported by an independent structure in order that the cylinder, the gear, and the rake may be lifted as a unit vertically away from the vessel to facilitate cleaning and repairs of the apparatus. The cylinder is equipped with connections 27 and 28 at its ends in order to admit high pressure fluid alternately to one end of the cylinder and then the other, and to allow low pressure fluid to flow away from the opposite end of the cylinder. The flow of fluid to and from the cylinder preferably is regulated by an automatic control mechanism in order that the operation of the rake will be automatic. Structure for supporting the cylinder, and mechanism for controlling its operation, are incorporated in the aforesaid application, Serial No. 374,686, now Patent No. 2,752,040 and form no part of the present invention.

The rake blade 29, which is best seen in Fig. 4, is comparatively rigid so that it will not bend in its longitudinal dimension to any great extent while moving sunken material to the outlets. The blade is preferably constructed of a heavy screen or mesh supported in a metal frame, and inasmuch as it is desirable that the rake be able to move even small particles of sink, the mesh has comparatively small apertures. The edge 31 of the blade 29, which contacts the inner surface of tank 10, is preferably made of rubber so as to be flexible enough to have a "wiping" action along the inner surface of the tank. The motion of the rake across the inner surface of the vessel is rather slow, and as a result, there is little vibration, and the power requirements are small. Because of the reciprocatory motion of the rake, the pool of medium is maintained relatively quiet during the operation of the apparatus.

Above the rake blade 29 is a screen 32 that is preferably rigidly mounted with respect to the rake arms 20. The rake screen 32 serves the function of lifting the pivotally mounted barrier screens so as to allow the sunken material to be carried into the sink outlets 12 and 13 by the action of the rake 11, and also serves the function of forming a pocket for the sunken material.

As best seen in Fig. 2, the material to be separated is fed into the vessel from the downwardly sloping feed box 35, this member being located at the back of the vessel and above the surface of the pool. A trough 37 is located above the feed box, from which the material to be separated is dropped into the feed box at the desired rate or times.

If desired, the piping system for supplying liquid medium to the vessel to replace that which flows out through float weir 18 can be provided to facilitate the introduction of material from the feed box into the vessel. This piping system principally consists of manifolds 38 and 39 which are located above the opposite ends of the vessel, the manifolds being extended along the back of the vessel to form a common rear manifold 41. The rear manifold may be partially enclosed in a box-like structure at the upper end of the feed box in the manner shown in Fig. 2. Slots 42 and 43 are provided along a lower portion of the rear manifold in order that replacement medium can flow from the rear manifold along the feed box 35. An obstruction 44 is provided at approximately the midpoint of the rear manifold so that the medium flowing from the slots 42 and 43 could be independently controlled if desired.

It has been found that under some conditions of operation, material suspended at or near the surface of the pool tends to float toward the outlets 12 and 13 where it could be carried along with the sunken material S into the sink launders 14 and 15. According to our invention, provision is made to maintain the material suspended at or near the surface of the pool of medium at substantially the mid-portion of the vessel so that such material will be carried through the float weir 18 rather than into the sink outlets 12 and 13. Movable barrier screens 33, 33a and 34, 34a are employed adjacent the outlets 12 and 13, respectively, to prevent the suspended material from being carried into the outlet so as to intermix with the sunken material removed by the rake. All four of the barrier screens generally resemble the screen illustrated in Fig. 3 of the drawing, although two of the screens are shorter than the other two. If desired, just one barrier screen may be used adjacent each sink outlet, but for reasons to be explained, the embodiment utilizing two screens adjacent each weir is preferred.

As previously mentioned, the barrier screens are lifted at the approach of the rake by the rake screen 32, to allow the sunken material to be carried into the sink launders 14 or 15. The barrier screens are freely suspended from the drive shaft 25 by means of arms 54, 54a and 55, 55a, respectively. Screen return stops 56 and 57 are provided in order that the screens will rest adjacent the outlets 12 and 13 in a position to prevent material suspended at or near the surface of the pool of medium from entering the sink launders.

The two sections comprising each barrier screen are best seen in Fig. 1 and in Figs. 5 through 10. Sections 33 and 34 are each movable along the inner surface of the vessel, the shorter sections 33a and 34a being movable in a path located above the inner surface. The fixed rake screen 32 of the rake is arranged to contact, on occasion, the lower portion of the section 33a or 34a, in order to raise both sections 33, 33a or 34, 34a.

In Figs. 5 through 7, the rake screen 32 is shown contacting screen section 34a in order to raise the two sections 34, 34a so that sink can be carried to outlet 13 for discharge from the vessel. In the instance here illustrated, a small amount of sink is being moved by the rake, and the single screen 34 could effectively prevent the material suspended at or near the surface of the pool of medium from being carried into the discharge outlet. Note Figs. 5 to 7.

Occasionally the sunken material carried by the rake will be of such a quantity as to extend along the inner surface of the vessel beyond the edge of screen 32 as shown in Figs. 8 through 10. In this event, were it not for the smaller section 34a of this barrier screen, some of the material suspended at or near the surface of the medium could pass in between section 34 and the rake screen 32, thereby contaminating the sunken material with floating material. As may be seen from Figs. 9 and 10, the screen section 34a can separate from section 34 when a comparatively large load of sunken material is being carried, the section 34a then resting directly against the rake screen 32. Thus an effective barrier is provided for all positions of the rake, so that there is little chance for the floating material to be carried into the outlets.

The barrier screen arrangement according to this invention can be employed in conjunction with means for the lateral introduction of replacement medium along the surface of the vessel. The medium to replace that discharged through the float weir 18 is injected into the vessel in such a manner as to produce currents at or near the surface of the pool of medium, flowing away from the discharge outlets 12 and 13. Because of these currents, the material suspended at or near the surface of the pool of medium is kept away from the ends of the vessel, and flows toward the float weir 18.

The replacement medium can be introduced from the manifolds 38 and 39 located above the ends of the vessel. A series of nipples or short pipes 45 and 46 are spaced along the bottom of the manifolds, through which the replacement medium is supplied to the vessel. The nipples are located over the end portions of the vessel, as best seen in Figs. 1 and 2 of the drawing. The flow of medium from the nipples can be arranged to pass through the barrier screens so as to cleanse the screens and to prevent the accumulation of debris thereon.

The liquid medium supplied through the nipples 45 and 46 preferably contributes most of the medium that is introduced to maintain the desired depth in the vessel. As an example, approximately 20% of the replacement medium can be supplied through the slots 42 and 43 of the rear manifold, the remaining 80% of the replacement medium being supplied approximately in equal quantities through the nipples of the two manifolds.

A typical example of the operation of this apparatus for the gravity separation of materials is as follows:

The vessel 10 is filled to the proper level with the desired medium, at which level there will be an overflow from the float weir 18. The control mechanism for the cylinder 22 is then placed into operation so that the rake 11 will be caused to move slowly back and forth along the inner surface of the vessel 10. The material to be separated, such as ore, minerals, coal, etc., is fed into the vessel from the trough 37 via the feed box 35. The lighter components of the material float at or near the surface of the medium, and are removed through the float weir 18.

By the action of the rake, the sunken material is moved to one or the other of outlets 12 or 13, where it falls down the sink launders 14 or 15 and out through the sink discharge chute 16.

The material suspended at or near the surface of the medium is prevented from approaching the outlets 12 and 13 by virtue of the barrier screens 33, 33a and 34, 34a arranged adjacent the respective ends of the vessel. The rake 11, upon approaching an outlet, can lift the respective barrier screens so as to move sunken material beyond the screens to a discharge point slightly above the discharge lip. By the use of double screens at each end of the vessel, the material suspended at or near the surface of the pool of medium is prevented from intermixing with the sunken material carried by the rake, despite the fact that such a quantity of sunken material is carried that it extends along the inner surface of the vessel beyond the edge of the rake screen.

The means described for introducing replacement medium into the vessel creates currents to keep the material that is suspended at or near the surface of the pool of medium from accumulating in any quantity at the barrier screens.

The speed of operation of the rake 11 may be varied in accordance with the type of material being processed, i. e. in relation to the time required for separation, the rate of feed, etc. A speed of eight discharges per minute or four discharges to each side per minute may be considered satisfactory for most purposes.

We have found it practicable to design apparatus in accordance with this invention, in its application to heavy media separation, which is capable of handling up to 400 tons of minerals or coal per hour. This is merely exemplary, however, and vessels may be designed for greater capacities as desired.

Subject matter disclosed but not claimed herein is claimed in the aforementioned copending application of Gerhart W. Schuetz, Serial No. 474,156, filed December 9, 1954.

The terms and expressions which we have employed are used in a descriptive and not a limiting sense, and we have no intention of excluding such equivalents of the invention described, or of portions thereof, as fall within the purview of the claims.

We claim:

1. Apparatus for gravity separation of materials in liquid media comprising a vessel to contain a pool of liquid medium, a rake movable along the bottom of said vessel to move sunken material to an outlet from which it can be discharged, and a barrier screen extending into the pool at a point near said outlet to keep material suspended at or near the surface of said medium away from said outlet, said barrier screen being freely mounted for movement from a position within the vessel to a position beyond said outlet and said rake having a portion arranged to engage said barrier screen whereby as the rake moves along the bottom of the vessel and approaches the outlet, said portion engages the barrier screen and pushes it into said position beyond the outlet.

2. Apparatus for gravity separation of materials in liquid media comprising a vessel to contain a pool of liquid medium, a rake movable along the bottom of said vessel to move sunken material to an outlet from which it can be discharged, said rake forming a pocket to receive said sunken material, and a barrier screen extending into the pool at a point near said outlet to keep material suspended at or near the surface of said medium away from said outlet, said barrier screen being freely mounted for movement from a position within the vessel to a position beyond said outlet and said rake having a portion arranged to engage said barrier screen whereby as the rake moves along the bottom of the vessel and approaches the outlet, said portion engages the barrier screen and pushes it into said position beyond the outlet.

3. Apparatus for gravity separation of materials in liquid media comprising a vessel to contain a pool of liquid medium, a rake movable along the bottom of said vessel to move sunken material from the bottom of the vessel to an outlet from which it can be discharged, and a barrier screen extending into the pool at a point near said outlet to keep material suspended at or near the surface of said medium away from said outlet, said barrier screen being constructed in two sections, the first of said sections having an edge movable along the bottom of said vessel and the second section being movable along a path located above said bottom, said rake having an upper portion arranged to engage said second section whereby as the rake moves along the bottom of the vessel and approaches the outlet, said upper portion engages said second section and said first section is engaged by the second section or by the sunken material being moved and is pushed into a position beyond the outlet.

4. Apparatus for gravity separation of materials in liquid media comprising a vessel to contain a pool of liquid medium, said vessel being of generally arcuate form in the vertical plane, a rake movable back and forth in a generally arcuate path within the vessel to move sunken material from the bottom of the vessel to discharge outlets at the respective ends of said path, and a barrier screen extending into the pool at a point near each of said outlets to keep material suspended at or near the surface of said medium away from said outlets, said barrier screen being freely mounted for movement from a position within the vessel to a position beyond said outlet and said rake having a portion arranged to engage said barrier screen whereby as the rake moves along its arcuate path and approaches the outlet, said portion engages the barrier screen and pushes it into said position beyond the outlet.

5. Apparatus for gravity separation of materials in liquid media comprising a vessel to contain a pool of liquid medium, said vessel being of generally arcuate form in the vertical plane, a rake movable back and forth in a generally arcuate path within the vessel to move sunken material from the bottom of the vessel to discharge outlets at the respective ends of said path, said rake forming a pocket to receive said sunken material, and a barrier screen extending into the pool at a point near each of said outlets to keep material suspended at or near the surface of said medium away from said outlets, said barrier screens being freely mounted for movement from positions within the vessel to positions beyond the respective outlets and said rake having a portion arranged to engage each barrier screen whereby as the rake moves along its arcuate path and approaches either of the outlets, said portion engages the respective barrier screen and pushes it into its position beyond such outlet.

6. Apparatus for gravity separation of materials in liquid media comprising a vessel to contain a pool of liquid medium, said vessel being of generally arcuate form in the vertical plane, a rake movable back and forth in a generally arcuate path within the vessel to move sunken material from the bottom of the vessel to discharge outlets at the respective ends of said vessel, and a barrier screen extending into the pool at a point near each of said outlets to keep material suspended at or near the surface of said medium away from said outlets, each barrier screen being constructed in two sections, the first of said sections having an edge movable along the inner surface at one respective end of the vessel and the second section being movable along a path located above said inner surface of said end, said rake having an upper portion arranged to engage said second section whereby as the rake moves along the bottom of the vessel and approaches the respective outlet, said upper portion engages said second section and said first section is engaged by the second section or by the sunken material being moved and is pushed into a position beyond such outlet.

7. Apparatus for gravity separation of materials in liquid media comprising a vessel to contain a pool of liquid medium, a rake movable along the bottom of said vessel to move sunken material to an outlet from which it can be discharged, means to introduce liquid medium into said vessel, a discharge means for floating material located in said vessel, said means for the introduction of liquid medium including at least one orifice adjacent the outlet to produce currents at or near the surface of the pool flowing generally in the direction of said discharge means so as to carry material suspended at or near the surface of said pool toward said discharge means, and a barrier screen extending into the pool at a point near said outlet to keep material suspended at or near the surface of said medium away from said outlet, said barrier screen being freely mounted for movement from a position within the vessel to a position beyond said outlet and said rake having a portion arranged to engage said barrier screen whereby as the rake moves along the bottom of the vessel and approaches the outlet, said portion engages the barrier screen and pushes it into said position beyond the outlet the rake forming a pocket to receive the sunken material, and the barrier screen, upon engagement by the rake, closing off the pocket.

8. Apparatus for gravity separation of materials in liquid media comprising a vessel to contain a pool of liquid medium, a rake movable along the bottom of said vessel to move sunken material to an outlet from which it can be discharged, means to introduce liquid medium into said vessel, a discharge means for floating material located in said vessel, said means for the introduction of liquid medium including at least one orifice adjacent the outlet to produce currents at or near the surface of the pool flowing generally in the direction of said discharge means so as to carry material suspended at or near the surface of said pool toward said discharge means, and a barrier screen extending into the pool at a point near said outlet, said barrier screen being constructed in two sections, the first of said sections having an edge movable along the bottom of said vessel and the second section being movable along a path located above said bottom, said rake having an upper portion arranged to engage said second section whereby as the rake moves along the bottom of the vessel and approaches the outlet, said upper portion engages said second section and said first section is engaged by the second section or by the sunken material being moved and is pushed into a position beyond the outlet.

9. Apparatus for gravity separation of materials in liquid media comprising a vessel to contain a pool of liquid medium, said vessel being of generally arcuate form in vertical section, a rake movable back and forth in a generally arcuate path within the vessel to move sunken material from the bottom of the vessel to discharge outlets adjacent the respective ends of said path, means to introduce liquid medium into said vessel, a discharge means for floating material located intermediate said ends, said means for the introduction of liquid medium including at least one orifice adjacent each outlet to produce currents at or near the surface of the pool flowing generally in the direction of said discharge means so as to carry material suspended at or near the surface of said pool toward said discharge means, and a barrier screen extending into the pool at a point near each end of the path of said rake to keep floating material away from said outlets, said rake forming a pocket to receive said sunken material, said barrier screens being freely mounted for movement from positions within the vessel to positions beyond the respective outlets and said rake having a portion arranged to engage each barrier screen whereby as the rake moves along its arcuate path and approaches either of the outlets, said portion engages the respective barrier screen and pushes it into its position beyond such outlet.

10. Apparatus for gravity separation of materials in liquid media comprising a vessel to contain a pool of liquid medium, said vessel being of generally arcuate form in vertical section, a rake movable back and forth in a generally arcuate path within the vessel to move sunken material from the bottom of the vessel to discharge outlets adjacent the respective ends of said path, means to introduce liquid medium into said vessel, a discharge means for floating material located intermediate said ends, said means for the introduction of liquid medium including at least one orifice adjacent each outlet to produce currents at or near the surface of the pool flowing generally in the direction of said discharge means so as to carry material suspended at or near the surface of the pool toward said discharge means, and a barrier screen extending into the pool at a point near each of said outlets to keep material suspended at or near the surface of said medium away from said outlets, each barrier screen being constructed in two sections, the first of said sections having an edge movable along the inner surface at one respective end of said vessel and the second section being movable along a path located above said inner surface of said end, said rake having an upper portion arranged to engage said second section whereby as the rake moves along the bottom of the vessel and approaches the respective outlet, said upper portion engages said second section and said first section is engaged by the second section or by the sunken material being moved and is pushed into a position beyond such outlet.

References Cited in the file of this patent

FOREIGN PATENTS

| 14,928 | Great Britain | June 28, 1913 |
| 685,071 | Great Britain | Dec. 31, 1952 |